INVENTORS
PAUL H. KEMMER
CARL E. REICHERT
CHARLES J. SPERE
BY

Jan. 25, 1944. P. H. KEMMER ET AL 2,339,783
SEALED UNIVERSAL MOUNTING
Filed Sept. 18, 1940 2 Sheets-Sheet 2

INVENTORS
PAUL H. KEMMER
CARL E. REICHERT
CHARLES J. SPERE
BY
ATTORNEYS

Patented Jan. 25, 1944

2,339,783

UNITED STATES PATENT OFFICE 2,339,783

SEALED UNIVERSAL MOUNTING

Paul H. Kemmer, Carl E. Reichert, and Charles J. Spere, Dayton, Ohio

Application September 18, 1940, Serial No. 357,190

6 Claims. (Cl. 89—37)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a mount for guns.

It is an object of this invention to sealingly mount a gun for universal movement in the wall of a compartment, the interior of which is maintained at a predetermined pressure.

It is a further object of this invention to provide a sealed universal mounting for a gun, which will permit substantially unrestricted expansion and contraction of the gun barrel.

It is another object of this invention to sealingly mount a gun in a wall, with freedom for expansion and contraction.

It is still another object of this invention to mount a gun in a wall with freedom for universal movement, with the universal mounting mechanism substantially flush with the exterior of the wall.

It is yet another object of this invention to provide a universal gun-mounting mechanism in the wall of a compartment in a tank or the like which is sealed for keeping out gas or the like.

Other objects and advantages of this invention will become apparent from the following description taken in connection with the accompanying drawings, it being clearly understood that the same are by way of illustration and example only and are not to be taken as in any way limiting the spirit or scope of this invention. The spirit and scope of this invention is to be limited only by the terms of the appended claims.

Figure 1:
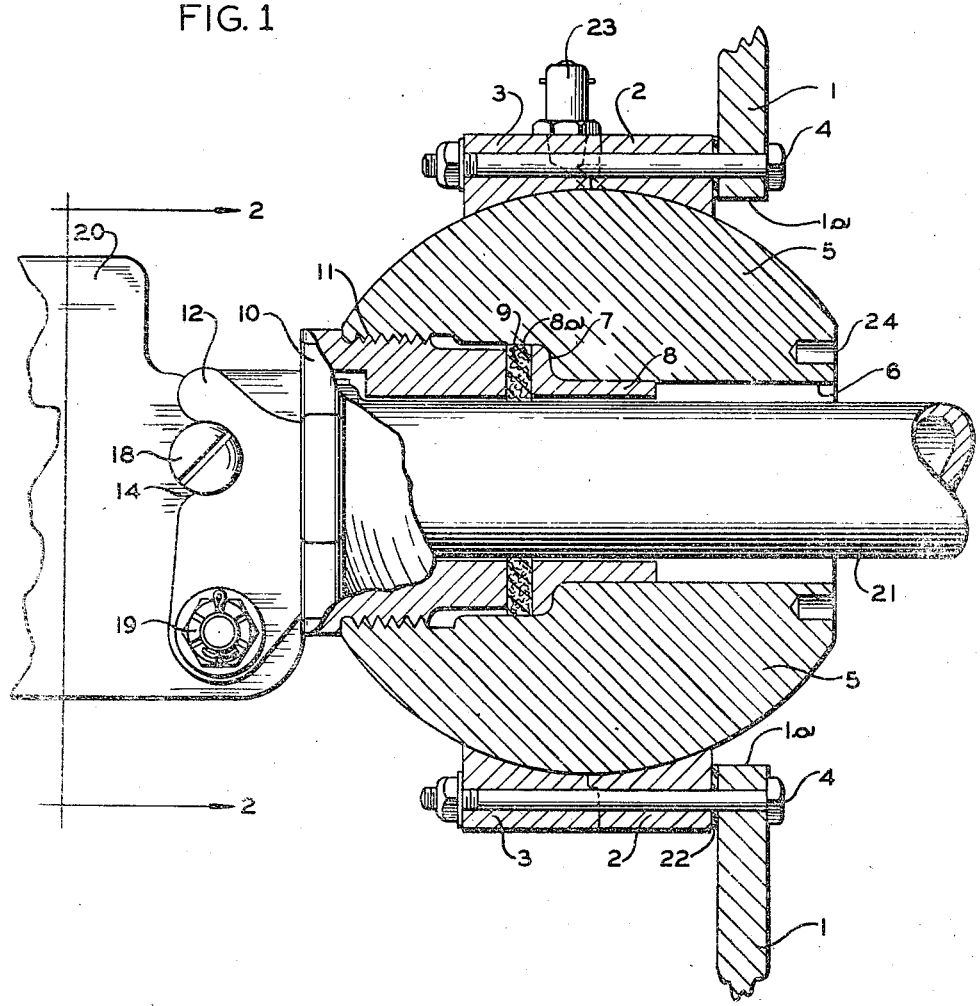
Figure 1 is a part sectional and part elevational view of the mount.
Figure 2:
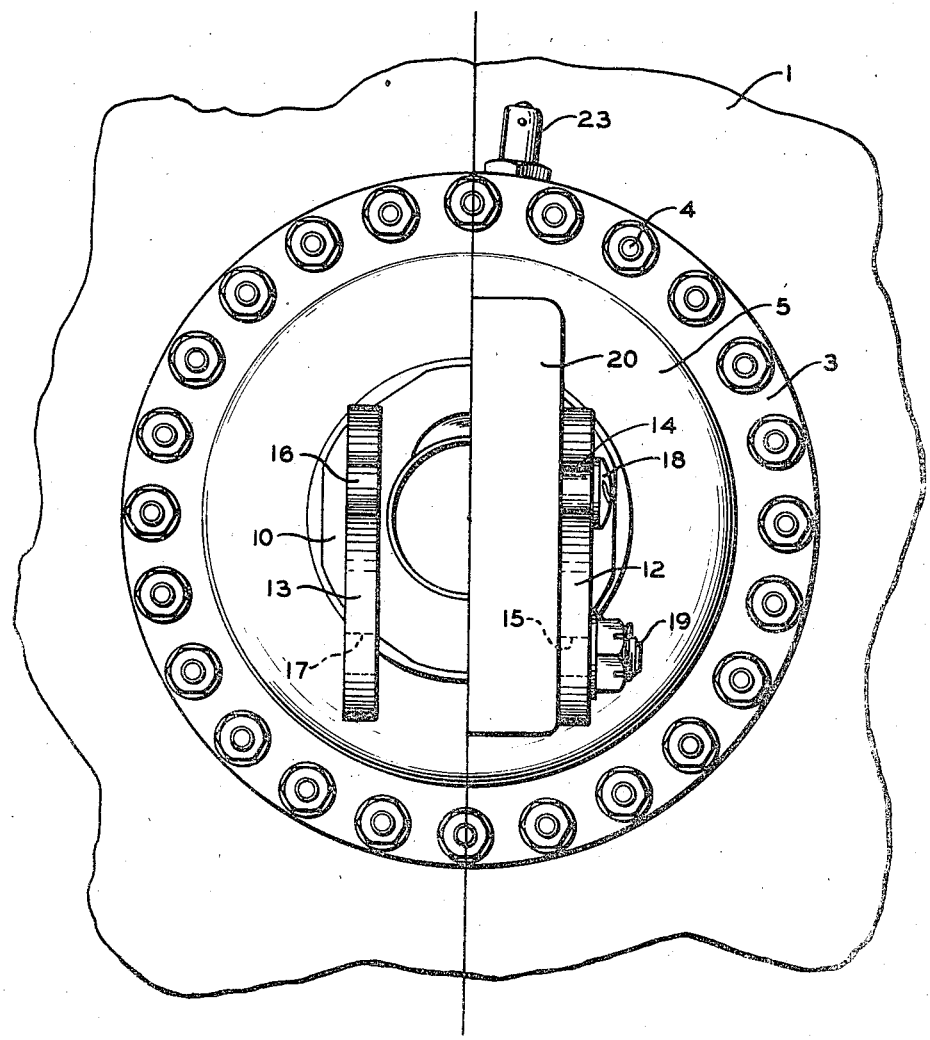
Figure 2 is a view taken generally along the lines 2—2 of Figure 1 showing an end view of the mount with the gun outlined in the right half and omitted in the left half.

Referring to the drawings, the wall 1 of a sealed gunner's compartment is provided with a circular opening 1a for the reception of ball 5 of the universal mount. Ball 5 is mounted for universal movement in mating plate-like socket members 2 and 3 adapted for bearing engagement with the spherical surface of the ball 5. Members 2 and 3 are bolted together interiorly of, and to, wall 1 by means of bolts 4 to carry ball 5 with its most forward portion substantially flush with the exterior of wall 1. Ball 5 is provided with a cylindrical opening or aperture 6 enlarged to provide a shoulder 7. Received in opening 6 is a bushing 8 having a flanged portion 8a adapted to abut shoulder 7. Ball 5 is interiorly threaded at 11 to receive a correspondingly threaded gun-carrying packing gland 10. The forward end of gland 10 engages packing element 9 and forces it into sealing engagement with the flanged portion 8a of member 8 and also with gun barrel 21. Gun barrel 21 is otherwise received in spaced relation in opening 6, gland 10 and bushing 8 with freedom for unrestricted expansion and contraction. This spaced relation of the barrel obviates binding of the barrel and accompanying inaccuracies of the gun. Packing gland 10 is provided with a pair of rearwardly projecting lugs 12 and 13, lug 12 of which is provided with a recessed opening 14 and a bolt-receiving opening 15. Lug 13 is provided with corresponding openings 16 and 17. Gun 20 is fastened to lugs 12 and 13 to be carried thereby by stud screws 18 received in recessed openings 14 and 16, and bolt 19 received in openings 15 and 17. The opening 6 in ball 5 is made sufficiently large to accommodate different sized gun barrels. In order to properly position the packing 9, the member 8 constituting a bushing or shim means is provided. As shown in Figure 1 of the drawings, the inner diameter of the member 8 is but slightly larger than the gun barrel 21. Similarly the internal diameter of the packing gland 10 is of substantially the same internal diameter as the member 8. Therefore, when packing gland 10 is screwed into position the packing will be compressed and held firmly in sealing position against the barrel of the gun. Obviously the internal diameters of members 8 and 10 may be varied to accommodate gun barrels of different diameters.

In order to effectively seal socket member 2 with respect to wall 1, a sealing member 22 is provided therebetween.

Movement of ball 5 in socket members 2 and 3 is facilitated by a suitable lubricant applied to the respective bearing surfaces through lubricant fitting 23. The lubricant also provides a seal between the ball and the socket elements.

Ball 5 is provided with openings 24 for the reception of a spanner wrench to aid in tightening packing gland 10.

It is to be understood that various modifications may be made in the details of apparatus without departing from the spirit or scope of the invention, it being intended to be limited only by the appended claims.

We claim:

1. A mount comprising a wall of a sealed compartment, said wall having an aperture therein, socket means sealingly attached to said wall with the longitudinal axis thereof in substantial alignment with said aperture, ball means received in said socket means, said ball means being provided with an aperture, an adapter having lug portions and a tubular portion, means detachably connecting said adapter to said ball means, means connecting a gun to said lug portions with the gun barrel received in and spaced from the aperture in said ball means, and sealing means between said gun barrel and said ball means, said tubular portion of said adapter constituting seal positioning means.

2. A mount comprising a wall of a sealed compartment, said wall having an aperture therein, socket means sealingly attached interiorly of said wall and adjacent said aperture, apertured ball means received in said socket means with the front of said ball substantially flush with the exterior of said wall, a gun carried by said ball means with the gun barrel received in and spaced from the walls defining the aperture in said ball means, and sealing means between said barrel and said last named aperture.

3. An adapter comprising a tubular body portion for receiving a gun barrel in spaced relation thereto, lug portions integral with said tubular body portion for attachment to a gun, and means for attaching said adapter to a gun-supporting member, said tubular body portion serving as means for operatively positioning a sealing means positioned between said gun and said supporting member.

4. A mount comprising a wall of a sealed compartment, said wall having an aperture therein, socket means sealingly attached to said wall with the periphery of said socket means adjacent the periphery of said aperture, ball means received in said socket means with freedom for universal movement, said ball means being provided with an aperture for loosely receiving a gun, sealing means between said gun and said ball means, and an adapter for connecting said gun to said ball means and for operatively positioning said sealing means.

5. A mount comprising a wall of a sealed compartment, said wall having an aperture therein, socket means sealingly attached to said wall with the longitudinal axis of the socket means in substantial alignment with said aperture, ball means operatively received in said socket means with freedom for universal movement, said ball means being provided with an aperture for loosely receiving the barrel of said gun, sealing means between said barrel and said ball means, and an adapter for connecting said gun to said ball means, said adapter including means for positioning said sealing means.

6. A sealed universal mount comprising socket means adapted to be sealingly mounted in alignment with an opening in a wall of a sealed compartment, ball means mounted in said socket means with freedom for universal movement therein, said ball means being provided with an aperture therethrough for receiving a gun barrel in spaced relation thereto, said aperture being of an enlarged diameter for a portion of its length to form a shoulder, a bushing abutting said shoulder and having an internal diameter slightly greater than the external diameter of said gun barrel, packing means positioned against said bushing and in engagement with said barrel, a packing gland for holding said packing in engagement with said bushing and barrel including a tubular portion having an internal diameter but slightly greater than the exterior diameter of said gun barrel and means on said packing gland for supportingly engaging of said gun.

PAUL H. KEMMER.
CARL E. REICHERT.
CHARLES J. SPERE.